United States Patent [19]
Williams et al.

[11] 3,911,883
[45] Oct. 14, 1975

[54] FUEL SYSTEMS FOR ENGINES

[75] Inventors: Malcolm Williams, Solihull; Geoffrey Albert Kenyon Brunt, Glastonbury; Christopher Robin Jones, Alcester, all of England

[73] Assignee: C.A.V. Limited, Birmingham, England

[22] Filed: Apr. 4, 1973

[21] Appl. No.: 347,721

[30] Foreign Application Priority Data
Apr. 4, 1972 United Kingdom............... 15346/72

[52] U.S. Cl................. 123/139 E; 123/119 CE
[51] Int. Cl............................................ F02m 39/00
[58] Field of Search ..... 123/32 EA, 139 E, 119 CE, 123/140 MC, 32 AC; 60/39.28

[56] References Cited
UNITED STATES PATENTS
| | | | |
|---|---|---|---|
| 2,627,370 | 2/1953 | Crum............................ | 123/119 CE |
| 3,107,483 | 10/1963 | Hamilton...................... | 123/140 MC |
| 3,303,348 | 2/1967 | Cox et al. ..................... | 123/119 CE |
| 3,630,177 | 12/1971 | Engel............................. | 123/32 EA |
| 3,695,242 | 10/1972 | Tada ............................. | 123/139 E |
| 3,699,935 | 10/1972 | Adler ............................ | 123/139 E |
| 3,707,950 | 1/1973 | Schlimime...................... | 123/139 E |
| 3,716,035 | 2/1973 | Adler et al. .................... | 123/139 E |
| 3,797,465 | 4/1974 | Habo............................. | 123/139 E |

Primary Examiner—Charles J. Myhre
Assistant Examiner—Ronald B. Cox
Attorney, Agent, or Firm—Holman & Stern

[57] ABSTRACT

A fuel system, particularly for a diesel engine, has a pump supplying fuel to the engine an actuator for controlling the pump and an electronic governor for controlling the actuator in accordance with the values of at least two parameters of the system. A supercharger increases the supply of air to the engine in certain circumstances, and when this happens the maximum pump output is changed in accordance with the output of the supercharger. The invention also resides in a transducer for use in the system.

8 Claims, 8 Drawing Figures

FUEL SYSTEMS FOR ENGINES

This invention relates to fuel systems for engines.

A fuel system according to the invention comprises in combination a pump supplying fuel to the engine, an actuator for controlling the pump, an electronic governor controlling the actuator in accordance with the values of at least two parameters of the system, a supercharger which increases the supply of air to the engine, and means responsive to operation of the supercharger for setting the maximum pump output.

In another aspect, the invention resides in a transducer comprising in combination transformer means producing an a.c. output having an amplitude dependent on the value of a parameter, a peak amplitude detector connected to the transformer means and producing across a capacitor a voltage dependent on the amplitude of the a.c. output, and means for setting the minimum and/or the maximum voltage level across the capacitor.

Figure 1:
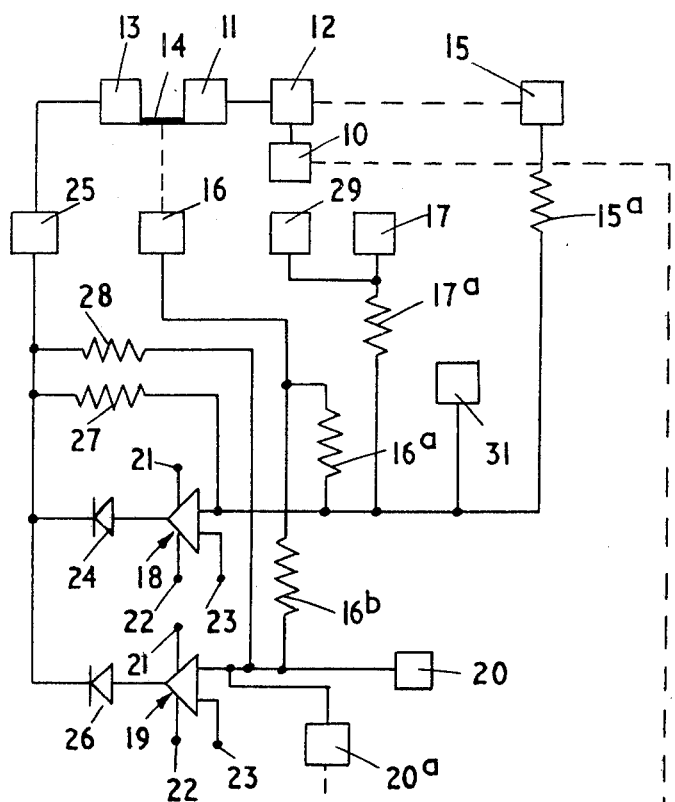
Figure 2:
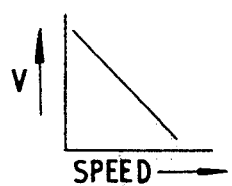
Figure 3:
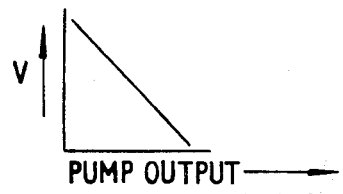
Figure 4:
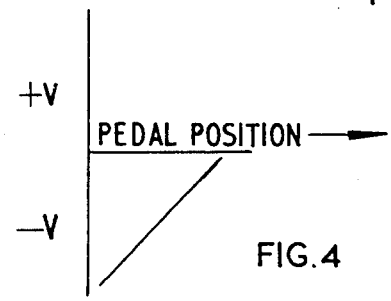
Figure 5:
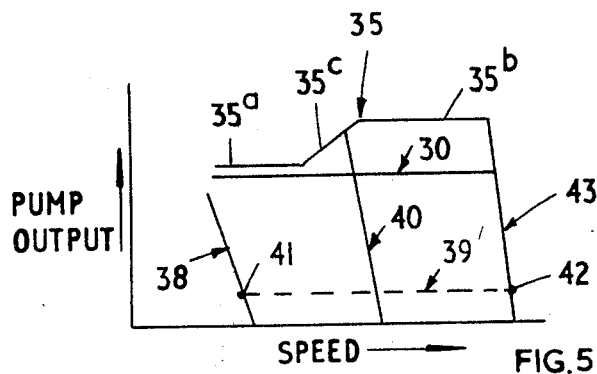
Figure 6:
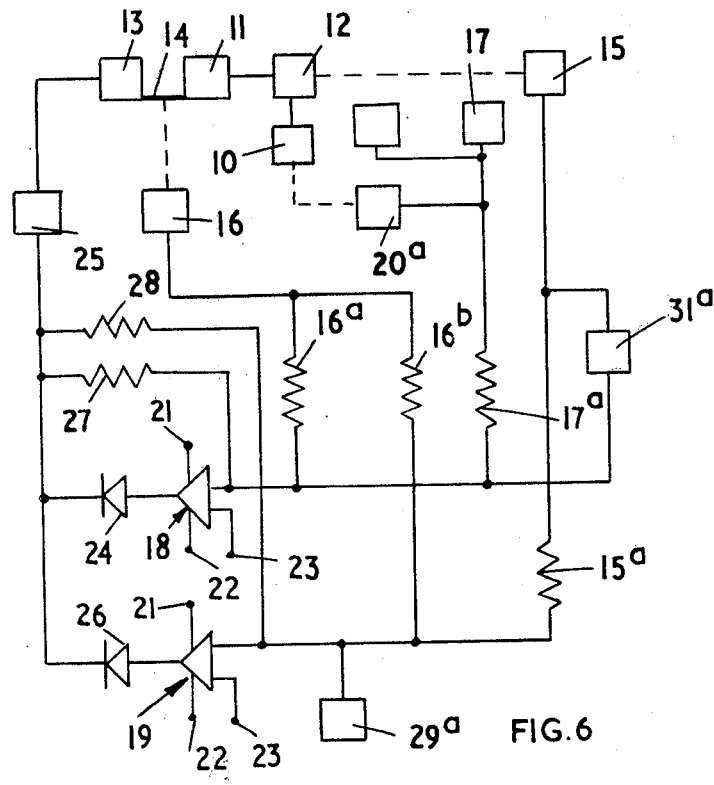
Figure 7:
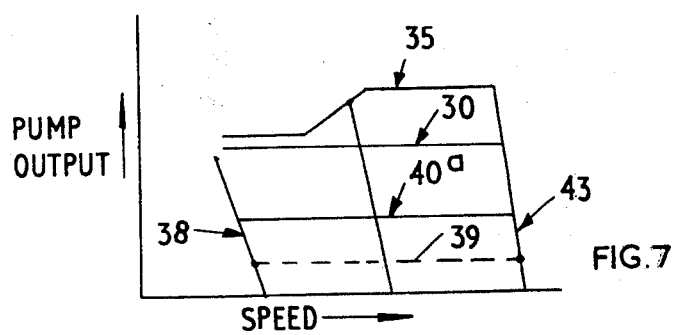
Figure 8:
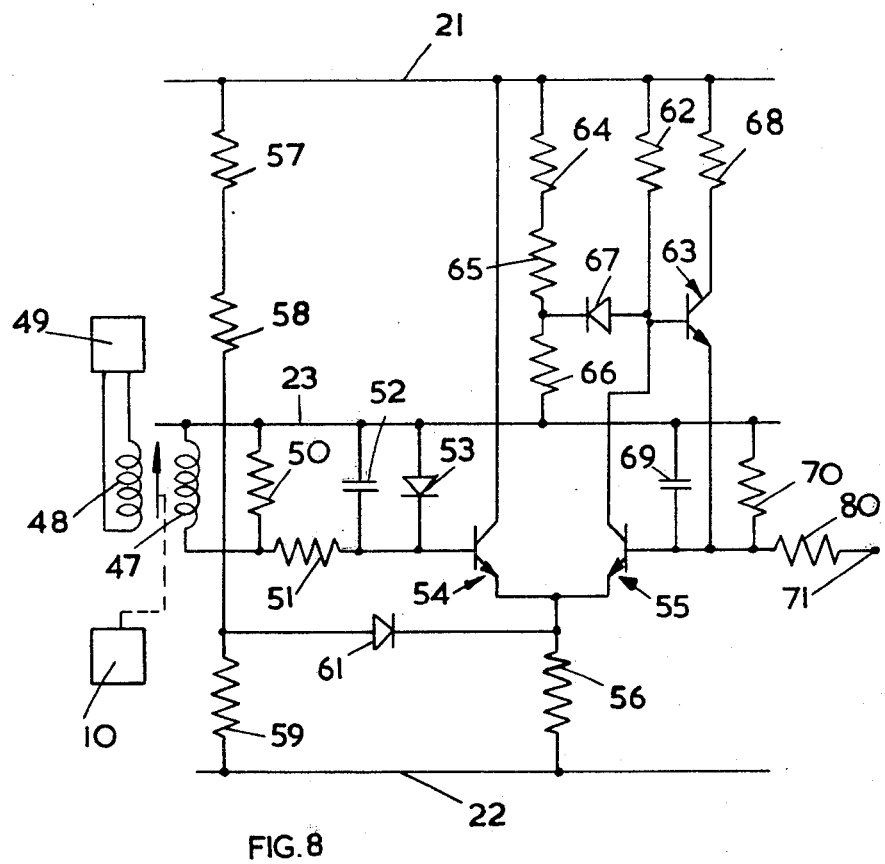

In the accompanying drawings,

FIG. 1 is a circuit diagram, partly in block form, illustrating one example of the invention, FIGS. 2 to 4 are graphs illustrating the outputs of three transducers used in FIG. 1, FIG. 5 represents a fuel-speed characteristic for an engine to be controlled by the arrangement of FIG. 1, FIG. 6 is a view similar to FIG. 1 of a second example of the invention, FIG. 7 is a view similar to FIG. 5 but showing the characteristic obtained by FIG. 6 and FIG. 8 is a circuit diagram showing the preferred form of maximum control circuit.

All the examples described relate to a fuel injection system for a supercharged diesel engine driving a road vehicle, so that demand is set by an accelerator pedal. However, the arrangements shown can be used with other supercharged engines, and the engine employed need not drive a road vehicle, in which case the demand is of course set in some other way.

Referring first to FIG. 1, a fuel pump 11 supplies fuel to the cylinders of an engine 12 in turn, the fuel pump being driven in a conventional manner, with the timing of injection controlled in the usual way. The driving of the fuel pump forms no part of the present invention and is not therefore described. Moreover, the type of pump used is not critical, but in the example shown the pump is a conventional in-line pump having a control rod 14 the axial position of which determines the rate of supply of fuel to the engine 12 by the pump 11. The axial position of the control rod 14 is controlled by an electro-mechanical actuator 13 to determine the pump output. The engine incorporates a supercharger shown at 10.

The system further includes three transducers 15, 16 and 17. The transducer 15 produces an output in the form of a voltage shown in FIG. 2, the magnitude of the voltage being dependent on the rotational speed of the engine. The transducer 16 produces an output voltage shown in FIG. 3 the voltage being dependent on the rate of supply of fuel to the engine, (i.e. the pump output). For this purpose the transducer 16 conveniently senses the axial position of the control rod 14 as indicated by the dotted line. The transducer 17 produces a voltage representing demand. Typically, the transducer 17 is controlled by the accelerator pedal of the vehicle which is driven by the engine, and in the particular example being described, the engine is controlled by an all-speed governor, so that the output from the transducer 17 is a voltage representing demanded engine speed. The form of this voltage is shown in FIG. 4, and it should be noted that the slope of this output is opposite to the slopes of the outputs from the transducers 15, 16.

The outputs from the transducers 15, 16 and 17 are all applied, by way of resistors 15a, 16a, 17a converting the signals to current to the inverting terminal of an operational amplifier 18 connected as a summing amplifier, whilst the output from the transducer 16 is also connected through a resistor 16b to the inverting terminal of an operational amplifier 19 connected as a summing amplifier. The amplifiers 18 and 19 are powered by positive and negative supply lines 21, 22 derived from the vehicle battery and have their noninverting terminals connected to a line 23 which is maintained at a reference potential which is a fixed proportion of the potentials of the lines 21, 22. The output from the amplifier 18 is fed through a diode 24 to a drive circuit 25 which incorporates a power amplifier and which serves to control the electro-mechanical actuator 13. Similarly, the output terminal of the amplifier 19 is connected to the drive circuit 25 through a diode 26. The diodes 24 and 26 together constitute a discriminator, which ensures that only the amplifier 18, 19 producing the more positive output is coupled to the drive circuit 25 at any given instant. Thus, if the amplifier 18 is producing the more positive output, then the diode 26 is reverse biased, and if the amplifier 19 is producing the more positive output, the diode 24 is reverse biased. FIG. 1 also shows the feedback resistors 27, 28 associated with the amplifiers 18, 19 respectively, and it will be noted that the feedback circuit for each amplifier is taken from the input terminal of the drive circuit 25. By virtue of this arrangement, the effect of the forward voltage drop across the diodes 24 and 26 is reduced by a factor dependent upon the amplifier open-loop gain, and so the temperature characteristics of the diodes become negligible when considering the temperature characteristics of the system. Also, there is a very sharp changeover from control by one amplifier to control by the other amplifier.

There are various other controls in FIG. 1, the purpose of which will be described later. However, the basic operation is as follows. The amplifier 18 receives current inputs representing demanded speed, actual speed and pump output, compares these currents and produces an output which is fed to the drive circuit 25, and causes the pump output to vary in the required manner until the output from the amplifier 18 becomes such that the drive circuit 25 produces just sufficient current to keep the control rod 14 in the position it has assumed.

The amplifier 19 receives a signal by way of the resistor 16b representing pump output and also receives a reference current from a transducer 20a sensitive to the pressure of the air supplied by the turbocharger 10 to the engine 12, the transducer 20a serving to modify the input to the amplifier 19 from a reference current source 20. If the pump output demanded by the amplifier 18 exceeds a value determined by the outputs of the transducer 20a and source 20 then the output from the amplifier 19 becomes more positive than the output of the amplifier 18, so that the diode 24 ceases to conduct as previously explained, and the amplifier 19 produces an output to the drive circuit 25. It should be noted that a larger positive output from an amplifier 18, 19 is in fact a demand for less fuel, that is to say there is an inverting stage between the amplifiers 18, 19 and pump. When the amplifier 19 is producing a greater positive output, the system operates in the same way as when the amplifier 18 is producing an output to reduce the output of the amplifier 19 to a value such that the output from the drive circuit 25 keeps the control rod 14 in the position it has assumed. The system will stay in this condition until the amplifier 18 demands less fuel than the maximum set by the amplifier 19. When the amplifier 18 demands less fuel, it produces a greater positive output than the amplifier 19, and so takes over the operation.

Referring now to FIG. 5, the way in which the governor is designed and operates can be seen from the graph of pump output against speed. This graph also shows the effect of a number of controls not yet mentioned in relation to FIG. 1. The line 40 is set by the amplifier 18 by virtue of the way in which the comparison of actual and demanded speeds is modified in accordance with the input from the transducer 16. The line 40 in the drawings represents 50% demand, and is one of a family of lines stretching from 0% demand to 100% demand. The extremes of this family, that is to say no demand (minimum speed) and full demand (maximum speed), are indicated at 38 and 43. The line 38 is set by a current source 21 providing an input to the inverting terminal of the amplifier 18, to ensure that the engine speed varies with pump output in the manner indicated by the line 38 even when the demand is zero. The maximum speed is set by a control 29 shown in FIG. 1 and which acts by limiting the maximum demand from the transducer 17.

The line 30 is set by the source 20 alone, and the line 35 is set by the source 20 and transducer 20a in combination. In the example shown, the line 35 has three portions 35a, 35b and 35c which will be explained in more detail later with reference to FIG. 8.

The boundary line 39 is a function of the engine, not the governor, and represents the no-load fuel requirements of the engine under different demands, so that the points 41 and 42 are the no-load engine speeds at zero and full demand, (i.e.) with the pedal released and fully depressed respectively.

FIG. 5 explains how the engine will behave in any circumstances. Suppose that the pedal has been set to demand 50%, corresponding to the line 40 shown in FIG. 5. The exact position on the line 40 at any given instant will depend upon the load on the engine, and so for this given setting of the pedal, the engine speed can vary within the limits set by the lines 35 and 40. The slope of the line 40 is, as previously explained, a result of the input to the amplifier 18 from the transducer 16. Assuming that the engine is operating at a particular point on the line 40, then if the vehicle starts to go up an incline, the load will increase, and so for a given position of the pedal the operating point will move up the line 40, so that the speed is reduced. If the load becomes sufficiently great, the line 35 will be reached (assuming that the supercharger is operating), and no further increase in pump output will be permitted. At this point, the speed falls rapidly. If the load decreases, then the operating point moves down the line 40 with the corresponding increase in speed. If the load decreases to zero, the line 39 is reached.

If the demand is changed, then assuming for the said of argument that it changes from 50% demand to 100% demand, the pump output will increase as rapidly as the pump and governor will allow until the line 35 is reached, and the engine will then move along the lines 35 onto the maximum demand line 43, and will assume a position on the line 43 which is dependent upon the load.

If the demand is reduced, then assuming the demand is reduced from 50% to 0%, the operating point will move vertically downwards until the fuel supply is zero. The speed then decreases until the line 38 is reached, after which the operating point moves up the line 38, finishing at a point on the line 38 determined by the load on the engine.

Turning now to FIG. 6, there is shown a second example in which the governor is a two-speed governor, that is to say a governor in which the demand signal is a fuel signal which is compared with the actual fuel, the pump output then being modified to provide the desired fuel output. In FIG. 6, the amplifier 18 receives a signal from the transducer 16 by way of the resistor 16a, this signal representing actual fuel. A signal representing demanded fuel is fed by way of the resistor 17a to the amplifier 18, but it will be noted that there is no speed term fed to the amplifier 18 from the transducer 15. The characteristics of the system are shown in FIG. 7. The line 40a is one of a family of horizontally extending lines which are set by the governor, and can be taken to represent the 50% demand line. When the pedal sets a demand of 50%, the amplifier 18 sets the required fuel level. The operating point on the line 40a will of course then depend on the load on the engine.

The amplifier 19 overrides the amplifier 18 in FIG. 6 in a similar manner to the arrangement in FIG. 1, except that the amplifier 19 now receives a signal by way of the resistor 15a representing speed, and also a reference current from a source 29a indicating the maximum engine speed. The amplifier 19 sets the maximum speed of the engine, which is indicated by the line 43 in FIG. 7. It will be noted that the line 43 has a slope, that is to say the maximum permitted speed varies with pump output. This slope is obtained by feeding to the amplifier 19 a signal representing pump output, this signal being fed by way of the resistor 16b.

The lines 30, 35 are set as in FIG. 1 to 5, the source 20 and transducer 20a acting to limit the maximum demand, in much the same way as the control 29 limits the maximum speed in FIG. 1. Finally, the minimum engine speed, indicated by the line 38, is set by a current source 31a, which is similar to the current source 31 except that because the current source 31a acts on the amplifier 18, which does not receive a speed term, the current source 31a must receive a speed term as indicated by its connection to the transducer 15.

Referring now to the preferred form of transducer 20a shown in FIG. 8, there is provided a fixed frequency oscillator 49 which provides an input to the primary winding 48 of a variable coupling transformer having a secondary winding 47. A part of the transformer is movable in response to the pressure of air supplied by the turbo-charger 10 to the engine, and so the signal in the secondary winding 47 will have an amplitude representing the pressure of air being supplied by the turbo-charger. One end of the winding 47 is connected to the line 23, and the other end of the winding 47 is connected to the line 23 through parallel paths one of which contained a resistor 51 and a capacitor 52 in series. The junction of the resistor 51 and capacitor 52 is connected to the line 23 through a diode 53, and is also connected to the base of an n-p-n transistor 54 having its collector connected to the line 21 and its emitter connected to the emitter of a further n-p-n transistor 55, and also connected through a resistor 56 to the line 22. The lines 21, 22 are interconnected through three resistors 57, 58 and 59 in series, and the junction of the resistors 58, 59 is connected through a diode 61 to the emitters of the transistors 54 and 55.

The collector of the transistor 55 is connected through a resistor 62 to the line 21, and is also connected to the base of an n-p-n transistor 63. Moreover, the lines 21, 23 are bridged by three resistors 64, 65 and 66 in series, and the junction of the resistors 65 and 66 is connected through a diode 67 to the base of the transistor 63. The collector of the transistor 63 is connected through a resistor 68 to the line 21, whilst its emitter is connected to the base of the transistor 55, and is also connected through a capacitor 69 and a resistor 70 in parallel to the line 23. The base of the transistor 55 is connected through a resistor 80 to an output terminal which can be connected to the amplifier 19 as shown in FIG. 1.

In operation, if the turbo-charger is not operating and there is no signal in the winding 47, the capacitor 69 is discharged and the maximum fuel is restricted by the source 20. If the turbo-charger is operating, then the output in the winding 47 has an amplitude dependent upon the pressure of air supplied to the engine by the turbo-charger 10, and the a.c. signal in the winding 47 is smoothed by the capacitor 52 and resistor 51 and applied to the transistor 54. During the positive half cycles of the signal, the transistor 54 is turned on and the transistor 55 is off, so that the transistor 63 is turned on by current flowing through the resistor 62, and charges the capacitor 69 by way of the resistor 68, which limits the peak current. The capacitor 69 charges until the voltage on the base of the transistor 55 is equal to the voltage on the base of the transistor 54, and so it will be seen that the capacitor 69 charges to the peak voltage of the signal appearing on the base of the transistor 54. During the negative half cycles, the capacitor 69 only discharges very slowly, and so in effect the voltage across the capacitor 69 at any given moment represents the amplitude of the signal in the winding 47, which in turn represents the pressure of air supplied by the turbo-charger. The voltage across the capacitor 69 serves to modify the reference signal supplied by the source 20. The purpose of the resistor 50 is to ensure that if any of the connecting leads should break, electrical noise would not operate the circuit. The diode 53 is provided to conduct during the negative half cycles of the signal in the winding 47 and so protect the transistor 54.

The arrangement so far described serves to produce the slope 35c. However, as shown in FIGS. 5 and 7, three slopes 35a, 35b and 35c are required. The lower limit 35a is set by the diode 61 in the following manner. When the transistor 55 is conducting, the potential of its emitter will be less than the voltage across the capacitor 69 by the voltage across the base-emitter of the transistor 55. If the potential of the emitter of transistor 55 falls below a predetermined voltage set by the resistors 57, 58 and 59, then the diode 61 can conduct, and current flows through the resistor 56 so that the transistor 55 conducts less, and the transistor 63 conducts sufficiently to maintain the output at a predetermined level. Variations in the base-emitter voltage of the transistor 55 are approximately cancelled out by variations in the voltage drop across the diode 61.

The upper limit 35b is set by the diode 67 in the following manner. The potential at the base of the transistor 63 when it is conducting will be above the output voltage at its emitter by the voltage drop across the base-emitter of the transistor 63. If this potential rises above a certain value set by the resistors 64, 65 and 66, then the diode 67 can conduct, and so current flowing through the resistor 62 can flow through the diode 67 and prevent the base voltage of the transistor 63 from rising further, so that the output to the amplifier is maintained at a predetermined level. Variations in the base-emitter potential of the transistor 63 are approximately cancelled out by equivalent variations in the potential across the diode 67.

We claim:

1. A fuel system for an engine, comprising a pump for supplying fuel to the engine, an actuator for controlling the pump, an electronic governor controlling the actuator in accordance with the values of at least two parameters of the system, a supercharger for increasing the supply of air to the engine, the maximum pump output having a first level when the output of the supercharger is below a predetermined level said pump output rising to a second level when the output of the supercharger reaches and exceeds said predetermined level, said maximum pump output being set in the governor by comparing an electrical signal representing pump output with a reference signal which varies in accordance with the output of the supercharger, means for producing said reference signal said means including a transducer comprising transformer means for producing an AC signal having an amplitude dependent upon the output of the supercharger, a peak amplitude detector connected to the transformer means, the peak amplitude detector including a transistor serving to charge a capacitor during alternate half-cycles of the output from the transformer means, the conduction level of the transistor being determined by the amplitude of said a.c. signal.

2. A system as claimed in claim 1 in which said first level and said second level are set by controlling the minimum and maximum conduction levels respectively of said transistor.

3. A system as claimed in claim 2 in which the maximum conduction level is set by a diode connected between the base of the transistor and a point of fixed potential.

4. A system as claimed in claim 2 in which the conduction of the transistor is determined by a second transistor which when conductive removes base current from the first transistor, the minimum conduction level of the first transistor being set by the second transistor.

5. A system as claimed in claim 4 in which the second transistor has its base connected to the capacitor and its emitter connected through a diode to a point of fixed potential.

6. A system as claimed in claim 4 in which the second transistor forms with a third transistor a long tailed pair with the transformer means coupled to the base of the third transistor.

7. A fuel injection system for a diesel engine, comprising in combination a pump for supplying fuel to the engine, an electro-mechanical actuator coupled to the pump to determine the pump output, a drive circuit for controlling the electro-mechanical actuator, first, second and third transducers producing respectively output voltages representing engine speed, pump output and demanded engine speed, a first operational amplifier connected as a summing amplifier and having its inverting input connected through resistors to the first, second and third transducers, said first amplifier producing an output representing the difference between the actual and demanded engine speeds, but the difference being modified in accordance with the input received from the second transducer so as to provide the required engine characteristics, a second operational amplifier connected as a summing amplifier and having its inverting input connected through a resistor to the second transducer, a discriminator coupling the outputs of the amplifiers to the drive circuit, the arrangement being such that until a predetermined pump output is attained, the discriminator couples the first amplifier to the drive circuit, but when said predetermined rate of supply of fuel is reached, the discriminator couples the second amplifier to the drive circuit to limit the maximum rate of supply of fuel, a supercharger which increases the supply of air to the engine, and a fourth transducer for detecting the output of the supercharger and providing a signal to the inverting input of the second amplifier to increase said predetermined rate of supply of fuel.

8. A fuel injection system for a diesel engine, comprising in combination a pump for supplying fuel to the engine, an electro-mechanical actuator coupled to the pump to determine the pump output, a drive circuit for controlling the electro-mechanical actuator, first, second and third transducers producing respectively output voltages representing engine speed, pump output and demanded pump output, a first operational amplifier connected as a summing amplifier and having its inverting input connected through resistors to the second and third transducers, said first amplifier producing an output representing the difference between the actual and demanded pump outputs, means restricting the maximum pump output to a predetermined value by restricting the demanded pump output, a second operational amplifier connected as a summing amplifier and having its inverting input connected through resistors to the first and second transducers, a discriminator coupling the outputs of the amplifiers to the drive circuit, the arrangement being such that until a predetermined enging speed is attained, the discriminator couples the first amplifier to the drive circuit, but when said predetermined engine speed is reached, the discriminator couples the second amplifier to the drive circuit to limit the maximum engine speed, the maximum engine speed being varied with pump output by the second amplifier, a supercharger which increases the supply of air to the engine, and a fourth transducer for detecting the output of the supercharger and providing a signal modifying the demanded pump output signal so as to increase said predetermined value of the maximum pump output.

* * * * *